United States Patent [19]

Smith

[11] Patent Number: 5,168,972

[45] Date of Patent: Dec. 8, 1992

[54] ONE-WAY DRIVE TRAIN CLUTCH ASSEMBLY FOR SUPERCHARGED ENGINE

[76] Inventor: Christopher L. Smith, 4803 McCullom Lake Rd., McHenry County, Ill. 60050

[21] Appl. No.: 813,478

[22] Filed: Dec. 26, 1991

[51] Int. Cl.⁵ ............................................. F16D 11/10
[52] U.S. Cl. ................................... 192/46; 192/56 R; 192/67 R; 123/559.1
[58] Field of Search ................. 192/46, 56 R, 67 R; 123/559.1, 559.3

[56] References Cited

U.S. PATENT DOCUMENTS

| 1,902,095 | 3/1933 | Parsons | 230/116 |
|---|---|---|---|
| 2,093,955 | 9/1937 | Clark | 64/24 |
| 2,255,424 | 9/1941 | Jandasek | 123/179 |
| 2,585,968 | 2/1952 | Schneider et al. | 60/13 |
| 2,851,024 | 9/1958 | Meeder | 123/559.3 |
| 3,225,876 | 12/1965 | Dison | 192/46 |
| 3,252,553 | 5/1966 | Peterson | 192/46 X |
| 3,433,337 | 3/1969 | Salter | 192/46 |
| 3,552,492 | 1/1971 | Mullins | 192/46 X |
| 3,603,436 | 9/1971 | Bartholomew | 192/46 |
| 3,640,254 | 2/1972 | Manfredi | 123/119 CF |
| 3,993,178 | 11/1976 | Mendoza-Orozco | 192/46 X |
| 3,997,042 | 12/1976 | Langham | 192/46 |
| 4,004,667 | 1/1977 | Vaitys | 192/46 X |
| 4,261,452 | 4/1981 | Barrows | 192/46 X |
| 4,485,793 | 12/1984 | Oguma | 123/559.3 |
| 4,563,997 | 1/1986 | Aoki | 123/559 |
| 4,610,235 | 9/1986 | Grunig | 123/565 |
| 4,708,119 | 11/1987 | Miyake | 123/559.3 |
| 4,724,817 | 2/1988 | Cook | 123/565 |
| 4,729,225 | 3/1988 | Bucher | 60/608 |
| 4,808,082 | 2/1989 | Kirchhofer et al. | 417/64 |
| 4,944,278 | 7/1990 | Woodard | 123/559.1 |

FOREIGN PATENT DOCUMENTS

| 0105254 | 1/1927 | Austria | 123/559.3 |
|---|---|---|---|
| 2345598 | 10/1977 | France | 123/559.3 |
| 1-104924 | 4/1989 | Japan | 123/559.3 |

Primary Examiner—Leslie A. Braun
Assistant Examiner—Andrea Pitts
Attorney, Agent, or Firm—Kajane McManus; Mathew R. P. Perrone, Jr.

[57] ABSTRACT

The one way clutch assembly of the present invention includes driving devices comprising two cooperating shafts which are configured to disengage one another upon stoppage or reversal of rotation of one of the shafts. One shaft is engaged to a supercharger drive shaft and the other is engaged to an actuating pulley for the supercharger which is belt driven by the engine. Such driving devices may be incorporated into the input shaft of the supercharger or into the crankshaft drive pulley of the engine. Upon the occurrence of a prematurely detonated intake charge in the engine, the driving devices disengage, with each rotating freely. After the force of detonation has decreased sufficiently and the engine has been stopped, the devices are easily reengageable for normal engine operation.

7 Claims, 2 Drawing Sheets

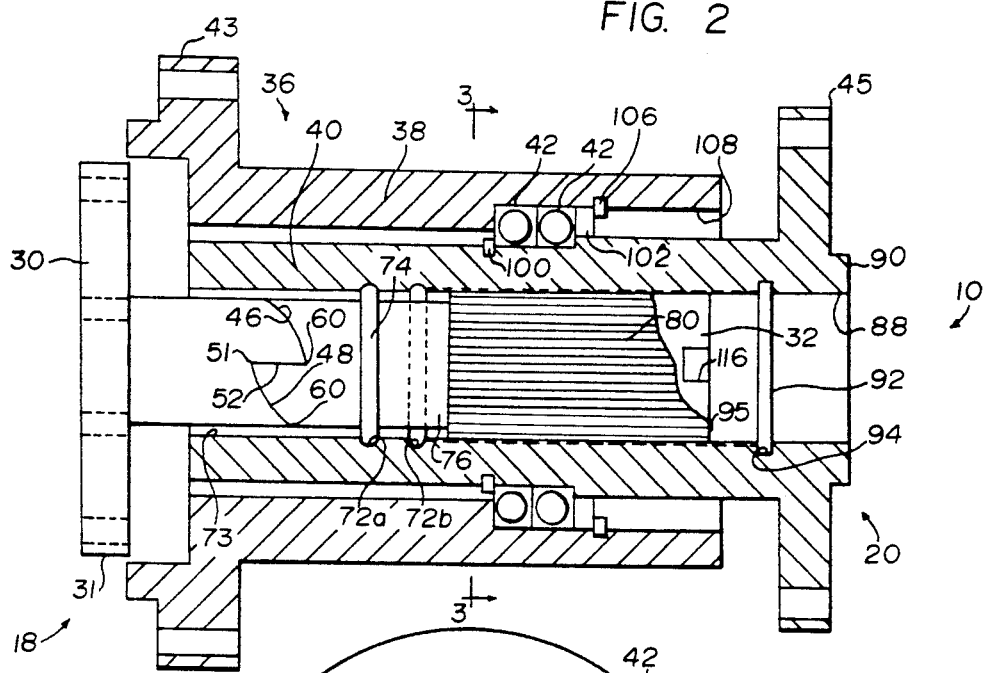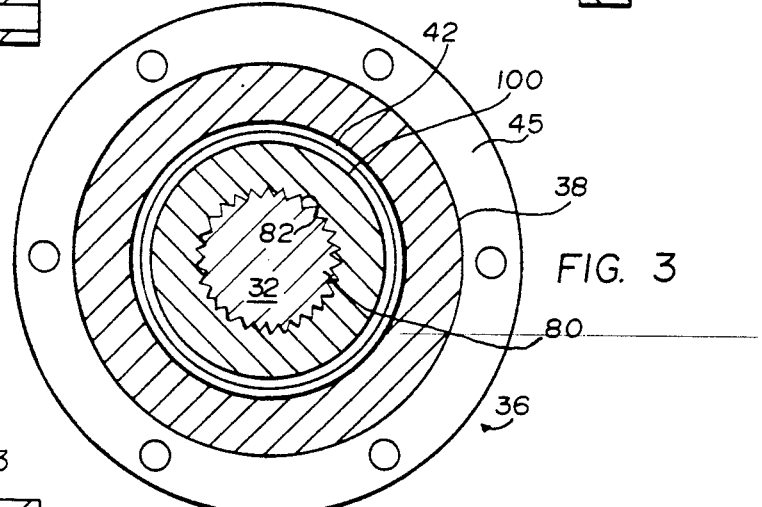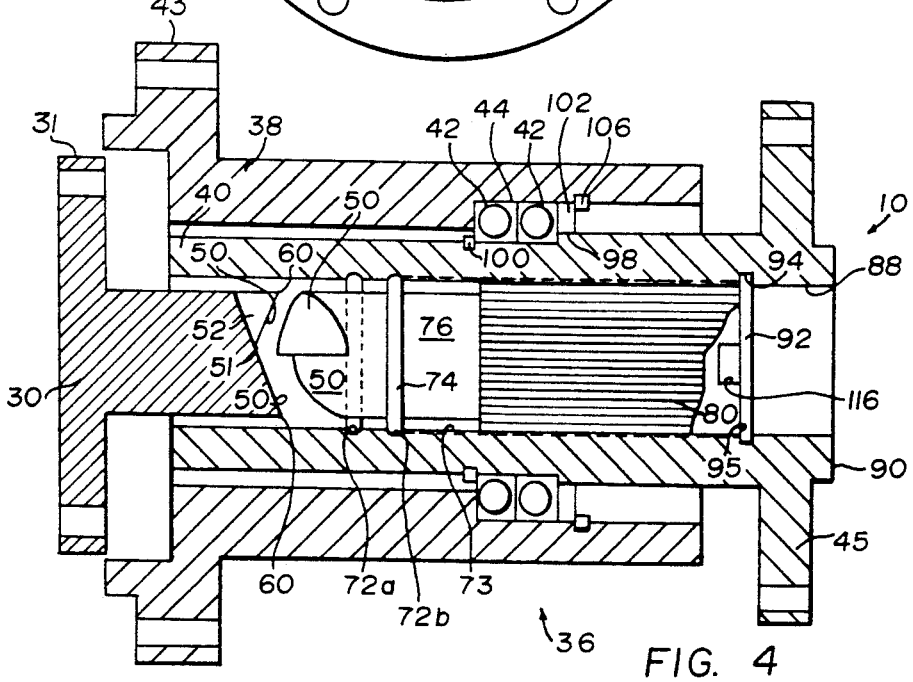

5,168,972

ONE-WAY DRIVE TRAIN CLUTCH ASSEMBLY FOR SUPERCHARGED ENGINE

BACKGROUND OF THE INVENTION

The present invention relates to a one way clutch assembly which allows for disengagement between ends of a drive train engaged between a supercharger and a belt driven engine crankshaft drive pulley to which the supercharger is engaged, when a premature detonation occurs in the engine intake manifold.

PRIOR ART

Modern superchargers provide high velocity intake flow to an engine and are operated from a belt-driven crankshaft pulley. Unlike turbocharging systems that have an inherent lag time from the flow of exhaust gases past the turbine, the performance advantage of a supercharger is nearly instantaneous. Unfortunately, the direct belt drive link from the crankshaft to the supercharger does not provide any "give" in the system.

As known, clockwise application of power from the drive belt drives the supercharger in normal fashion. In the event of a premature detonation in the intake manifold, a counteracting force is generated, stopping the supercharger and momentarily reversing rotation of the supercharger input shaft. When the engine is pushed close to its performance limit, a "blown" engine may be the end result.

Heretofore, it has been found that provision of a blow out plate on the supercharger is useful in venting to atmosphere the blow back from a prematurely detonated intake charge in an intake manifold of an engine.

The blow out plate, upon explosion, is blown off the housing, eliminating potential reversal of rotation of the input shaft of the supercharger or crankshaft drive pulley.

In this respect, when such premature detonation, commonly known as a backfire, takes place, blow back from the detonation causes reverse rotation of the drive train, causing catastrophic engine failure as well as supercharger failure.

Also, the Schneider U.S. Pat. No. 2,585,968 discloses a supercharged engine having hydraulic means to connect the turbine to the engine output shaft at high load. The hydraulic means comprise pressed rollers, an outer cylinder member and an inner cam member of standard one way design. The one way design permits rotation of the clutch in one direction only, holding it stationary when exposed to fluid reaction in the opposite direction. The clutch permits power transfer from the turbine to the shaft. However, when the shaft begins to rotate faster than the turbine, the turbine is disengaged and rotates idly on the shaft.

Further, the Jandasek U.S. Pat. No. 2,255,424 discloses a one way clutch interposed between a supercharger and its associated engine. A central driving member is disclosed around which a driven member is engaged. An inner surface of the driven member is serrated and only rotates in one direction relative to the driving member.

Still further, the Parsons U.S. Pat. No. 1,902,095 discloses a blower and driving gear for engines. Within this structure, flanged rings are provided to each side of the impeller, the rings being spring biased toward one another. In this manner, if the impeller is bent or broken, or its path is obstructed, the resistance will stop action of the impeller, with the impeller slipping between the flanges.

SUMMARY OF THE INVENTION

One object of the clutch assembly of the present invention is to provide a mechanism which eliminates destruction of an engine and supercharger when a premature detonation of an intake charge takes place.

A further object is to provide a clutch assembly which is easily reengagable for proper engine function.

A still further object of the invention is to provide a clutch assembly which eliminates the need to provide a blow out plate on the supercharger housing.

A still further object of the invention is to provide a clutch assembly which is a simple structure and which is easily incorporated into existing supercharger systems.

These and other objects are specifically met in the one way clutch assembly of the present invention which provides, on either the input shaft of the supercharger or on the crankshaft of the engine, two shafts which are engageable, the congruous surface of each being provided with a configuration which maintains connection about the area of engagement when the shafts are rotating in the correct direction, and causes disengagement therebetween when one of the shafts stops rotating or reverses rotational direction.

Upon such reverse rotation, the clutch assembly will uncouple, with one of the shafts being retracted as well, allowing the supercharger to continue reverse rotation and vent the exploding intake charge without creating any deleterious effects in the engine. After back pressure from the explosion decreases the engine can be stopped to permit the shafts to be simply reengaged, allowing once again for normal operation.

BRIEF DESCRIPTION OF THE DRAWINGS

Other objects and advantages of the invention will become more apparent upon perusal of the detailed description thereof and upon inspection of the drawings in which:

FIG. 2 is a longitudinal sectional view through the elements forming the one way clutch assembly of the present invention, and shows the shafts thereof engaged to one another.

FIG. 3 is a radial cross sectional view through the clutch assembly showing a splined engagement between one shaft and a surrounding inner sleeve of the assembly.

FIG. 4 is a longitudinal sectional view similar to FIG. 2 but showing the shafts disengaged from one another.

DESCRIPTION OF THE PREFERRED EMBODIMENT

Figure 1:
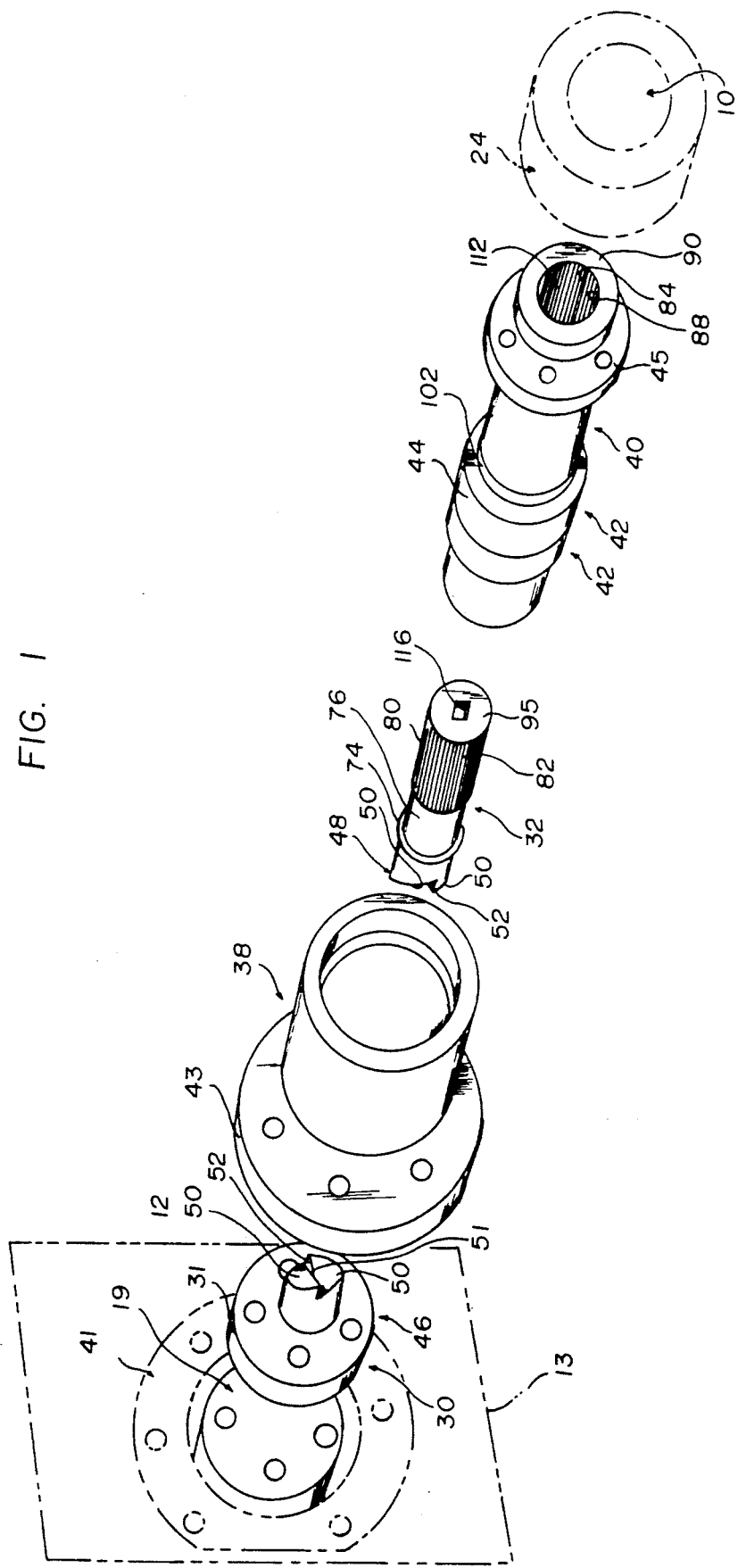
FIG. 1 is an exploded perspective view of a supercharger drive assembly incorporating the one way clutch assembly of the present invention therein.

Referring now to the drawings in greater detail there is illustrated therein the one way clutch assembly of the present invention generally identified by reference numeral 10.

In order to keep the description to a minimum, the clutch assembly 10 is shown incorporated into a drive assembly 12 for a supercharger 13, although it will be understood that the clutch assembly 10 could be incorporated into a crankshaft of an engine as well. One end 18 of the clutch assembly 10 engages a drive shaft hub 19 of the supercharger 13. At an opposite end 20, the clutch assembly 10 engages a supercharger driving pulley 24 which is belt driven off the engine (not shown) in known manner.

As will be defined in greater detail hereinafter, the clutch assembly 10 creates a breakable engagement between the pulley 24 and the drive shaft hub 19 of the supercharger 13, such breakable engagement being of significant importance if a premature detonation of an intake charge should occur.

In this respect, the assembly 10 includes two shafts comprising a nose shaft 30 mounted to the drive shaft hub 19 of the supercharger 13 by bolting of an end flange 31 thereof to the hub 19 and a pulley shaft 32 which is indirectly engaged to the pulley 24. These shafts 30 and 32 engage each other within a core area 34 of a nose housing 36. The nose housing 36 is formed from first or outer and second or inner sleeves 38 and 40, respectively. First sleeve 38 engages on a housing 41 of supercharger 13 by bolting of an end flange 43 of the sleeve 38 to the housing 41. Second sleeve 40 is engaged to pulley 24 in a manner to be rotatable therewith, and extends into and within the first sleeve 38 to a point just short of the point at which sleeve 38 engages the supercharger housing 41. This sleeve 40 includes an end flange 45 which is used to bolt the sleeve 40 to the pulley 24.

The sleeve 38 is spaced from the sleeve 40 and sleeve 40 has a pair of circumferential bearings 42 engaged therearound, an outer surface 44 of the bearings 42 engaging the sleeve 38 in a fixed manner. Thus, while sleeve 38 is fixed in position, sleeve 40 can rotate therewithin, upon rotation of the pulley 24 to which it is secured.

As shown, a free end 46 of shaft 30 engages against one end 48 of shaft 32, the ends 46 and 48 being provided with a one way friction fit configuration. This one way friction fit configuration is provided in the form of two congruous surfaces, each having two semi-circular ramps 50 thereon which angle opposite one another, with the congruous surfaces of shafts 30 and 32 fitting together in one alignment only.

In this respect, each ramp 50 on one of the shafts 30 or 32 forms a shoulder 52 where it extends above the level of the contiguous ramp 50 on the shaft 30, 32, to either side of a center point 51 on the surface, creating a pair of radial shoulders 52 on each shaft 30, 32. These shoulders 52 face in the same rotational direction on each shaft 30, 32.

The ramps 50 and shoulders 52 on shaft 30, when engaged appropriately against the ramps 50 and shoulders 52 on shaft 32, create a frictional engagement between contiguous shoulders 52. These shoulders 52, when the shafts 30 and 32 are turning in one direction, bear against each other, causing the shafts 30 and 32 to rotate together.

However, should the shaft 30 stop momentarily or reverse in direction of rotation, upon backfire of the engine, the shoulder 52 engagement between the shafts 30 and 32 is caused to dissociate, and a tip 60 of each shoulder 52 rides along a coacting ramp 50 on the opposing shaft, the distance of travel being such that the shafts 30 and 32 are completely separated and can now rotate independently of one another.

Further, once separation has been achieved, structure is provided to maintain this separation until reengagement is desired.

In this respect, and looking particularly at shaft 32 and sleeve 40, it will be seen that the sleeve 40 has two circumferential grooves 72 cut into an inner surface 73 thereof.

These grooves 72 are separated by a specific distance. In this respect, these grooves 72 provide for frictional engagement therein of a circumferential compressible ring 74 fixed on an outer radially inwardly stepped surface portion 76 of the shaft 32. This ring 74 is positioned along the shaft 32 so as to engage a first longitudinally outward one of the grooves 72a in the sleeve 40 when the shaft 32 is engaged against the other shaft 30 in a manner to be rotatable therewith.

The other longitudinally inner groove 72b is positioned so that the ring 74 is engaged therein when the shoulder surfaces 52 of the shafts 30 and 32 separate a predetermined distance, freeing the shafts 30 and 32 from engagement to one another.

This compressible ring 74 and groove 72 engagement provides a means by which the shaft 32 is not allowed to arbitrarily slide back and forth within the sleeve 40, engaging and disengaging from the shaft 30 at will.

Inasmuch as the shaft 32 must engage the sleeve 40 in a manner to be rotated thereby, the surface of a larger in diameter portion 80 thereof is splined, the splines 82 engaging cooperating splines 84 provided on a inner surface 88 of the sleeve 40.

The splines 84 on the sleeve 40 extend from a pulley engaging end 90 thereof engaged to the pulley 24 to a point just short of the inner groove 72b, so as not to interfere with same.

To assure that the shaft 32 does not travel past a point of engagement with the inner groove 72b as it disengages, a stop member in the form of a snap ring 92 is seated within a groove 94 at the pulley engaging end 90. The snap ring 92 abuts against end 95 of the shaft 32 when the ring 74 thereon engages in the innermost groove 72b.

To assure engagement of the bearings 42 to the outer surface of the sleeve 40 they are seated against an upstanding shoulder 98 on the sleeve 40 and are fixed thereagainst by a further snap ring 100 as shown.

Finally, to assure that the inner sleeve 40 and outer sleeve 38 are sealingly engaged to one another, a ring seal 102 is engaged between the sleeves 38 and 40 and is maintained in position by abutting against the bearing 42 engaged against the shoulder 98 and being fixed thereagainst by a further snap ring 106 fixed into inner surface 108 of the outer sleeve 38.

When a premature detonation of an intake charge occurs, the hub 19 of the supercharger 13 may stop or reverse its rotation. When this situation arises, shafts 30 and 32 separate as described above, with each shaft 30, 32 now rotating freely of the other.

The engine is now shut down and once all rotation of the shafts 30 and 32 ceases, the shafts 30 and 32 are appropriately reengaged by passing a tool, such as a screwdriver, through a center opening 110 in the pulley 24, through a center opening 112 in sleeve 40, engaging the tip of the screwdriver within an end slot 116 in end surface 95 of shaft 32, aligning the shafts 30 and 32 and forcing them back into their engaged functional position by pushing on the screwdriver until the ring 74 engages in the groove 72a. The engine then may be restarted.

As described above the clutch assembly 10 of the present invention has a number of advantages, some of which have been described above and others of which are inherent in the invention. Also modifications may be proposed to the clutch assembly 10 without departing from the teachings herein. Accordingly the scope of the invention is only to be limited as necessitated by the accompanying claims.

I claim:

1. A one way clutch assembly for use in forming a driving device having ends thereof disengageable from one another, the assembly comprising: two rotatable aligned driving elements which frictionally engage one another in a releasable manner and disengage when one of said elements rotates in a direction reverse to the direction in which the other element rotates, means for maintaining alignment of the elements, and means for engaging an opposite end of each element to a rotatable structure, said driving elements comprising two shafts, said frictional engagement formed between said shafts being created by alternately ramped frictional engaging surfaces thereof, each frictional engaging surface including two oppositely angled semicircular ramps therein, said element alignment means comprising an inner sleeve engaged to one of said shafts in a manner to be rotatable therewith while allowing said shaft to be longitudinally slidable therein and rotatably engaged to a fixed in position outer sleeve by means of bearings, said inner sleeve and said shaft engaged thereto including cooperating members thereon for fixing the shaft in preselected positions within said inner sleeve, one preselected position maintaining the shafts engaged and another preselected position maintaining the shafts disengaged, structure being provided between said inner and outer sleeves to create a seal therebetween.

2. The assembly of claim 1 wherein said semicircular ramps create a shoulder therebetween, said shoulders extending radially outwardly and upwardly from a center point of the frictional engaging surface.

3. The assembly of claim 2 wherein said shoulders face in the same rotational direction.

4. The assembly of claim 3 wherein said shoulders on one shaft engage against directly opposing shoulders on the other shaft.

5. The assembly of claim 4 wherein each shoulder includes a tip which engages against a ramped surface on the opposing shaft which underlies the tip.

6. A one way clutch assembly for use in forming a supercharger input shaft which is capable of uncoupling the supercharger from an engine operated pulley to which it is engaged, upon premature detonation of an intake charge, the assembly comprising: an inner sleeve which is fixedly engaged to the belt driven engine pulley, an outer sleeve engaged to a housing of the supercharger and two rotatable shafts extending within said inner sleeve which frictionally engage one another in a releasable manner and disengage when one of said shafts rotates in a direction reverse to the direction in which the other shaft rotates, one of said shafts being engaged to said inner sleeve in a manner to be driven thereby and driving said other shaft which is fixedly engaged to a drive shaft hub of the supercharger; said frictionally engaged shafts each having a pair of oppositely angled semicircular ramps on frictionally engaged surfaces thereof which create shoulders therebetween, said shoulders extending radially outwardly and upwardly from a center point of said frictionally engaged surface, the shoulders on each shaft facing in the same rotational direction.

7. The assembly of claim 6 wherein said shoulders of one shaft engage said shoulders of said other shaft and wherein each shoulder includes a tip which engages against a ramped surface on the opposing shaft which underlies the tip.

* * * * *